United States Patent
Dover

(10) Patent No.: US 12,506,607 B2
(45) Date of Patent: Dec. 23, 2025

(54) MEMORY SYSTEM SECURITY AND AUTHENTICATION USING ASYMMETRIC KEYS

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 292 days.

(21) Appl. No.: 17/663,123

(22) Filed: May 12, 2022

(65) Prior Publication Data

US 2023/0129728 A1    Apr. 27, 2023

Related U.S. Application Data

(60) Provisional application No. 63/270,798, filed on Oct. 22, 2021.

(51) Int. Cl.
*H04L 9/08* (2006.01)
*H04L 9/06* (2006.01)
*H04L 9/14* (2006.01)

(52) U.S. Cl.
CPC .............. *H04L 9/0894* (2013.01); *H04L 9/06* (2013.01); *H04L 9/0825* (2013.01); *H04L 9/088* (2013.01); *H04L 9/14* (2013.01)

(58) Field of Classification Search
CPC ....... H04L 9/0894; H04L 9/06; H04L 9/0825; H04L 9/088; H04L 9/14
See application file for complete search history.

(56) References Cited

U.S. PATENT DOCUMENTS

| 10,666,431 B1* | 5/2020 | Nguyen | H04L 67/55 |
| 2003/0084290 A1* | 5/2003 | Murty | H04L 63/0823 |
| | | | 713/168 |

(Continued)

FOREIGN PATENT DOCUMENTS

CN    113518978 A    10/2021

OTHER PUBLICATIONS

Chinese patent office, "China Office Action," issued in connection with China Patent Application No. 202211273137.5 dated May 31, 2025 (15 pages).

*Primary Examiner* — Theodore C Parsons
*Assistant Examiner* — Alan L Kong
(74) *Attorney, Agent, or Firm* — Holland & Hart LLP

(57) ABSTRACT

Methods, systems, and devices for memory system security and authentication using asymmetric keys are described. In some examples, host systems and memory systems may be configured to implement techniques for the generation and distribution of asymmetric keys, which may support evaluating the authenticity of interfacing systems (e.g., system identities) in connection with exchanged signaling, such as access commands, requests, data, or other signaling. Such techniques may include implementing asymmetric cryptographic security directly in a memory system. For example, a memory system may be configured to be cryptographically identified by a public asymmetric key, and authenticity of the memory system may be proven by signing a challenge using an asymmetric private key of the memory system. Further, a host system may be identified by signing signaling with its asymmetric private key, and the signature may be verified by a memory system using an asymmetric public key of the host system.

25 Claims, 7 Drawing Sheets

(56) References Cited

U.S. PATENT DOCUMENTS

| | | | |
|---|---|---|---|
| 2010/0250939 A1* | 9/2010 | Adams | H04L 63/10 |
| | | | 713/168 |
| 2011/0002461 A1* | 1/2011 | Erhart | G06F 21/73 |
| | | | 340/5.83 |
| 2014/0032935 A1* | 1/2014 | Kim | G06F 21/6218 |
| | | | 713/193 |
| 2020/0067708 A1* | 2/2020 | Subba | H04L 9/3226 |
| 2020/0127813 A1* | 4/2020 | Millar | G06Q 20/363 |
| 2020/0311314 A1 | 10/2020 | Troia et al. | |
| 2020/0322151 A1* | 10/2020 | Latimer | H04L 63/10 |
| 2021/0350032 A1 | 11/2021 | Dover et al. | |
| 2022/0085983 A1* | 3/2022 | Hillier | H04L 9/0825 |
| 2022/0182247 A1* | 6/2022 | Schmidt | H04L 9/3247 |
| 2022/0200968 A1* | 6/2022 | Helmick | H04L 9/0825 |

* cited by examiner

MEMORY SYSTEM SECURITY AND AUTHENTICATION USING ASYMMETRIC KEYS

CROSS REFERENCE

The present application for patent claims the benefit of U.S. Provisional Patent Application No. 63/270,798 by DOVER, entitled "MEMORY SYSTEM SECURITY AND AUTHENTICATION USING ASYMMETRIC KEYS," filed Oct. 22, 2021, assigned to the assignee hereof, and expressly incorporated by reference herein.

FIELD OF TECHNOLOGY

The following relates generally to one or more systems for memory and more specifically to memory system security and authentication using asymmetric keys.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
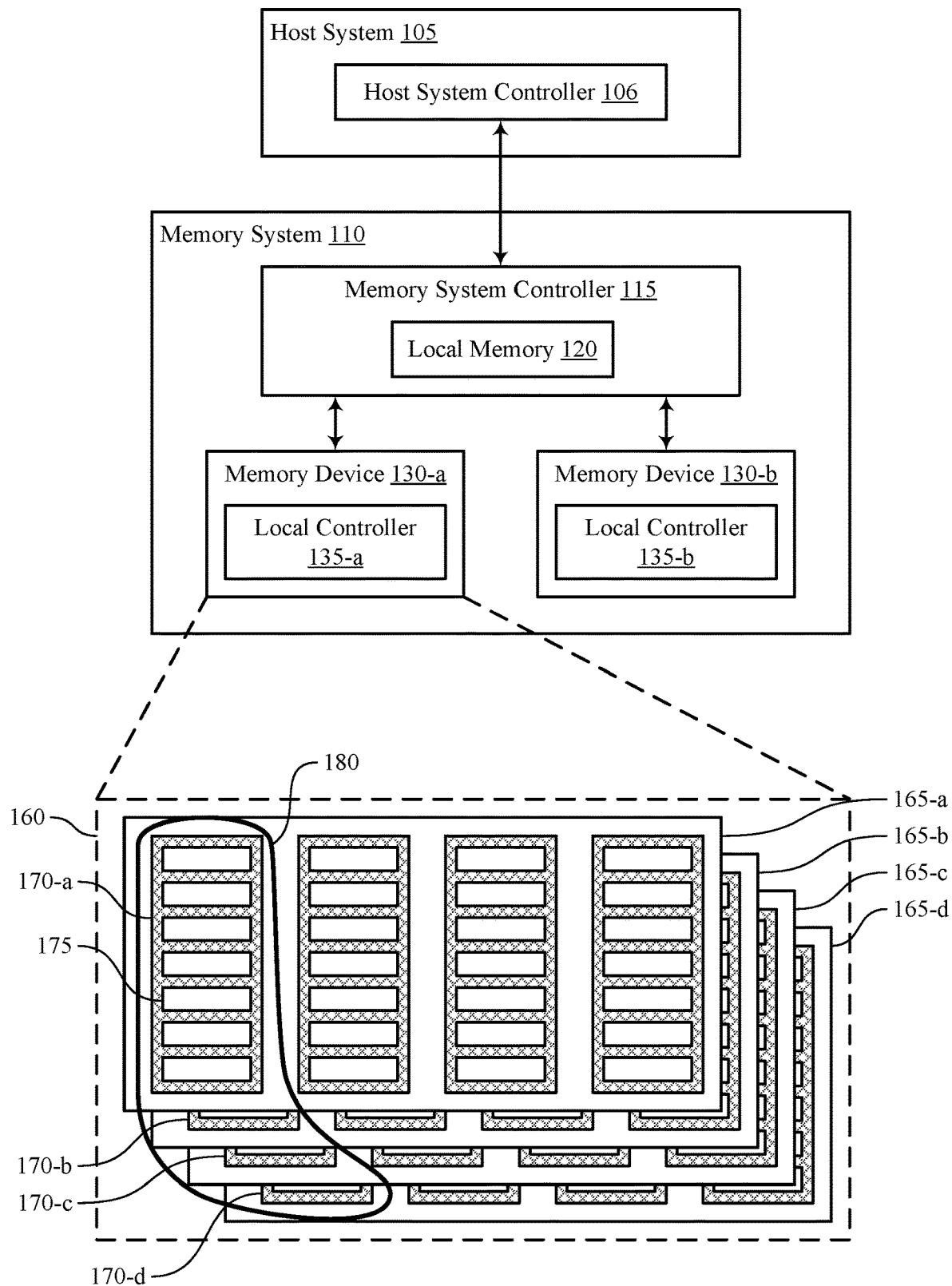
FIG. 1 illustrates an example of a system that supports memory system security and authentication using asymmetric keys in accordance with examples as disclosed herein.

Some computing platforms may involve one or more host systems that are operable to communicate with (e.g., directly or indirectly) one or more memory systems. In some examples, maintaining security or integrity of such computing platforms may rely on an authentication of interconnected systems, such as authentication of system identities, to verify that such systems are exchanging signaling, such as access commands, requests, data, and other signaling with authenticity (e.g., between known and verified transmitting systems and receiving systems). However, some techniques for maintaining authenticity of system identities, including some cryptographic protection techniques, may be vulnerable to identification information or authentication information being stolen, cloned, or otherwise insecurely implemented, or may not have been implemented in the context of signaling between host systems and memory systems themselves for establishing authenticity of specific devices (e.g., in accordance with unique hardware or device identities).

In accordance with examples as disclosed herein, host systems and memory systems may be configured to implement various techniques for the generation and distribution of asymmetric public keys, which may support evaluating the authenticity of interfacing systems (e.g., system identities, hardware identities) prior to responding to exchanged signaling, such as access commands, requests, data, or other signaling (e.g., to evaluate whether to trust received signaling, to evaluate whether to perform a responsive action, such as an access or configuration of a memory system, to perform authenticated read commands or authenticated write commands). In some examples, such techniques may include implementing asymmetric cryptographic security functionality directly in a memory system. For example, a memory system may be configured to be cryptographically identified (e.g., by a host system) by a public asymmetric key of the memory system, which may be associated with a unique hardware identity of the memory system, and authenticity of the memory system may be proven by signing a challenge using a private asymmetric key of the memory system. In some examples, a host system may be identified by signing commands with a private asymmetric key of the host system, which may be associated with a unique hardware identity of the host system, and the signature may be verified by a memory system using a public asymmetric key of the host system. Once established, cryptographic signaling (e.g., commands, requests, data) and responses can be facilitated by either the asymmetric keys or symmetric keys, as determined by a configuration of the systems (e.g., in accordance with a command configuration bit at a host system, a memory system, or both). By implementing such techniques at a device-level or system-level for the generation and distribution of asymmetric device identification information such as asymmetric public keys, interfacing hardware devices may support greater security (e.g., a stronger verification of authenticity) than other techniques where the distribution of cryptographic hardware identification information is not performed, or where such distribution may be more vulnerable to being cloned or stolen, such as techniques that distribute symmetric keys in a manner that may be insecure.

Figure 2:
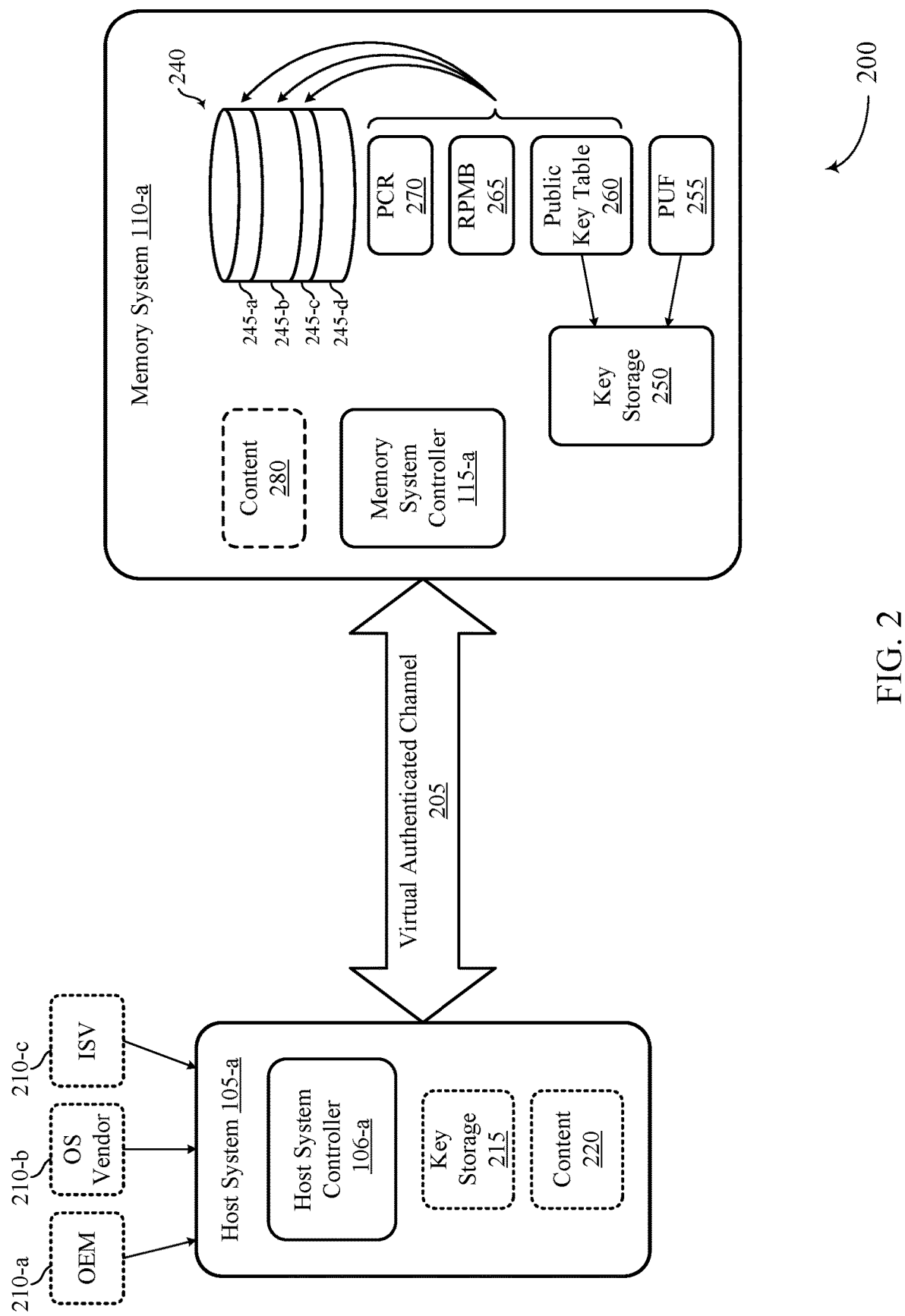
FIG. 2 illustrates an example of a system that supports memory system security and authentication using asymmetric keys in accordance with examples as disclosed herein.

Features of the disclosure are initially described in the context of systems with reference to FIGS. 1 and 2. Features of the disclosure are described in the context of a process flow with reference to FIG. 3. These and other features of the disclosure are further illustrated by and described in the context of apparatus diagrams and flowcharts that relate to memory system security and authentication using asymmetric keys with reference to FIGS. 4 through 7.

FIG. 1 illustrates an example of a system 100 that supports memory system security and authentication using asymmetric keys in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, or entities (e.g., hardware entities, firmware entities, software entities), or various combinations thereof, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although a single host system 105 and a single memory system 110 is shown in FIG. 1, a host system 105 may be coupled with any quantity of memory systems 110, and a memory system 110 may be coupled with any quantity of host systems 105.

The host system 105 may be coupled with the memory system 110 via at least one physical host interface, which may support various signaling between the host system 105 and the memory system 110. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device. In some examples, the components of the memory system 110 may be implemented in a single semiconductor die, such as in a system-on-chip (SoC) implementation.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support memory system security and authentication using asymmetric keys. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In accordance with examples as disclosed herein, the host system 105 and the memory system 110 may be configured to implement various techniques for the generation and distribution of asymmetric public keys, which may support evaluations of the authenticity of the host system 105 and the memory system 110 (e.g., system identities, hardware identities) prior to responding to exchanged signaling, such as access commands, requests, data or other signaling (e.g., to evaluate whether to trust received signaling, to evaluate whether to perform a responsive action, such as an access or configuration of the memory system 110, to perform authenticated read commands or authenticated write commands). In some examples, such techniques may include implementing asymmetric cryptographic security functionality directly in the memory system 110. For example, the memory system 110 may be configured to be cryptographically identified by a public asymmetric key, and authenticity of the memory system 110 may be proven by signing a challenge using an asymmetric private key of the memory system. In some examples, the host system 105 may be identified by signing commands with an asymmetric private key of the host system 105, and the signature may be verified by the memory system 110 using the asymmetric public key of the host system 105. Once established, cryptographic signaling (e.g., commands, requests, data) and responses can be facilitated by either the asymmetric or symmetric keys, as determined by a configuration of the systems (e.g., in accordance with a command configuration bit at the host system 105, at the memory system 110, or both). By implementing such techniques at a device-level or system-level for the generation and distribution of asymmetric device identification information such as asymmetric public keys, the host system 105 and the memory system 110 may support greater security (e.g., a stronger verification of authenticity) than other techniques where the distribution of cryptographic hardware identification information is not performed, or where such distribution may be more vulnerable to being cloned or stolen, such as techniques that distribute symmetric keys in a manner that may be insecure.

FIG. 2 illustrates an example of a system 200 (e.g., a compute platform) that supports memory system security and authentication using asymmetric keys in accordance with examples as disclosed herein. The system 200 may include a host system 105-a and a memory system 110-a, which may be examples of the respective systems described with reference to FIG. 1. The host system 105-a and the memory system 110-a may implement various techniques for exchanging public keys to support the communication of signaling between the respective systems with identity authenticity (e.g., signatures) and integrity (e.g., encryption), among other characteristics, which may be based on unique and private cryptographic identities of the host system 105-a and the memory system 110-a. The host system 105-a may include a host system controller 106-a and the memory system 110-a may include a memory system controller 115-a, and, in some examples, the host system controller 106-a and the memory system controller 115-a may be configured to perform one or more of the described operations at the host system 105-a and the memory system 110-a, respectively. Although techniques are described with reference to a single host system 105-a and a single memory system 110-a of the system 200, the described techniques may be extended to support implementations of a host system 105 that is coupled with any quantity of memory systems 110, or implementations of a memory system 110 that is coupled with any quantity of host systems 105, or implementations of a network of multiple host systems 105 coupled with multiple memory systems 110.

The host system 105-a may be an example of a system that uses at least a portion of the memory system 110-a (e.g., storage 240) for information storage, which may include various operations that support the host system 105-a writing information to the memory system 110-a, or the host system 105-a reading information from the memory system 110-a, or both. In some examples, the host system 105-a may be characterized as being "local," which may refer to a relatively direct or proximal physical, electrical, or otherwise communicative coupling. In some other examples, the host system 105-a may be characterized as being "remote," which may refer to a relatively distant (e.g., non-co-located) communicative coupling that may involve one or more wired, wireless, optical, or otherwise relatively distant communicative couplings, such as a cloud application or otherwise distributed compute system.

In some examples, the host system 105-a may include, may be coupled with, or may be otherwise associated with one or more host entities 210. Host entities 210 may be implemented as hardware entities, firmware entities, or software entities, and may include various serial, parallel, or hierarchical coupling or logical organization with or via the host system 105-a. In some examples, the host entities 210 may request or otherwise perform signaling with the memory system 110-a via a common controller or interface (e.g., via host system controller 106-a). In various examples, host entities 210 may be associated with different functions, different feature sets, different permissions, different storage attributes (e.g., data protection attributes), among other different characteristics.

In some examples, each of the host entities 210 may be associated with a unique identifier (e.g., a secret identifier, a unique device secret, a unique entity secret), which may include or may support the generation of a respective private key for the host entity 210. In some examples, an identifier of a host entity 210 may not, itself, be private, but a private key may be generated (e.g., by the host system 105-a) for a host entity 210 based on an identifier (e.g., public or private) of the host entity 210 and a private identifier of the host system 105-a (e.g., a private master identifier). Such techniques may support each of the host entities 210 being uniquely identified and authenticated (e.g., separately from other host entities 210) in accordance with examples as disclosed herein.

The example of host system 105-a may be associated with an original equipment manufacturer (OEM) host entity 210-a, an operating system (OS) vendor host entity 210-b, and an independent software vendor (ISV) host entity 210-c. In some other examples, a host system 105 may include or be otherwise associated with any quantity of one or more host entities 210 including but not limited to one or more OEM host entities 210, OS vendor host entities 210, ISV host entities 210, or other types of host entities. In some examples, host entities 210 may be omitted or otherwise not separately considered, in which case a master private key may be implemented by the host system 105-a (and any host entities 210, where applicable), which may be based on a single or shared unique identifier of the host system 105-a (e.g., a secret identifier, a unique device secret, or a unique host secret associated with the host system 105-a).

In some examples, the host system 105-a may be associated with a location for storing authentication or encryption information (e.g., generated or received keys, certificates), such as a key storage 215. For example, the host system 105-a may use the key storage 215 to store one or more private keys or certificates associated with the host system 105-a. In some examples, a key storage 215 may be a portion of the host system 105-a, such as an implementation of a dedicated storage component of the host system 105-a. Additionally, or alternatively, one or more components of the key storage 215 may be located outside the host system 105-a, but may be otherwise accessible by the host system 105-a (e.g., in a secure manner). In various examples, the key storage 215 may include a non-volatile storage location (e.g., for static keys or keys maintained for a relatively long time), or a volatile storage location (e.g., for ephemeral keys or keys that are otherwise generated relatively frequently), or both. Although the key storage 215 is illustrated separately from the host system controller 106-a, in some examples, the key storage 215 may be part of or otherwise associated with the host system controller 106-a, such as a storage location that also includes firmware for the host system 105-a or the host system controller 106-a.

In some examples, the host system 105-a may include content 220, which may refer to various types of information stored at the host system 105-a. In some examples, content 220 may be accessed or otherwise used to support various key generation (e.g., content-based key generation) or other cryptographic techniques in accordance with examples as disclosed herein. For example, the content 220 may include firmware of the host system 105-a, such as boot code (e.g., second-stage boot code, "L1" boot code), or a firmware security descriptor (FSD), which may be used to establish an operating or cryptographic state (e.g., a firmware state) of the host system 105-a. In some examples, information associated with the content 220 may be transmitted to the memory system 110-a to support various authentication or encryption techniques (e.g., for the memory system 110-a to generate keys or certificates for operation with the memory system 110-a). Although the content 220 is illustrated separately from the host system controller 106-a, in some examples, the content 220 may be part of or otherwise associated with the host system controller 106-a, such as a storage location that includes firmware for the host system 105-a or the host system controller 106-a.

The memory system 110-a may include storage 240, which may refer to a collective storage capacity of one or more instances of local memory 120, or of one or more memory devices 130, or various combinations thereof that are included in or are otherwise associated with the memory system 110-a. In some examples, the storage 240 may be divided or otherwise organized in partitions 245 (e.g., memory ranges, address ranges), which may refer to various subsets or ranges of logical addresses or physical addresses of the associated local memory 120 or memory devices 130. In some examples, the partitions 245 may be assigned with an initial range of addresses, and may be updated with an assignment to a different range of addresses, including an appending of additional new addresses, an assignment to a subset of the initial range of addresses (e.g., a trimming of ranges), or an assignment to an entirely new range of addresses.

In some examples, partitions 245, or portions thereof, may be assigned to or allocated to different functions or attributes, such as examples where one or more partitions 245 are associated with a respective one or more host entities 210, or their respective public or private keys. In an example implementation, a partition 245-a may be associated with the OEM host entity 210-c, a partition 245-b may be associated with the OS vendor host entity 210-b, and a partition 245-c may be associated with the ISV host entity 210-c. In some examples, a partition 245-d may be unallocated (e.g., not dedicated to a certain purpose or entity, free space), or may be shared among multiple host entities 210, among other examples for allocating partitions 245. In some examples, partitions 245 may be used to implement various hierarchical keying or authentication techniques. For example, each partition 245, or some portion of a partition 245, may be assigned with or updated with a protection attribute (e.g., enabling or disabling a write protection attribute, enabling or disabling a read protection attribute), which may be associated with various keys, authentications, or encryptions that are specific to a given host entity 210, or that are common to the host system 105-a in general, among other examples.

In some examples, the memory system 110-a may be associated with a location for storing authentication or encryption information (e.g., generated or received keys, certificates), such as a key storage 250. For example, the memory system 110-a may use the key storage 250 to store one or more private keys associated with the memory system 110-*a*, or one or more public keys or certificates generated by the memory system 110-*a*, or one or more public keys or certificates received from the host system 105-*a* (or other host systems 105, not shown). In some examples, the key storage 250 may be a portion of the memory system 110-*a*, such as an implementation of a dedicated storage component of the memory system 110-*a*. Additionally, or alternatively, the key storage 250 may be located outside the memory system 110-*a*, but may be otherwise accessible by the memory system 110-*a* (e.g., in a secure manner). In various examples, the key storage 250 may include a non-volatile storage location (e.g., for static keys or keys maintained for a relatively long time), or a volatile storage location (e.g., for ephemeral keys or keys that are otherwise generated relatively frequently), or both. Although the key storage 250 is illustrated separately from the storage 240, the key storage 250 may, in some examples, be included in a portion of the storage 240 (e.g., in a separate or dedicated partition 245). Further, although the key storage 250 is illustrated separately from the memory system controller 115-*a*, in some examples, the key storage 250 may be part of or otherwise associated with the memory system controller 115-*a*, such as a storage location that also includes firmware for the memory system 110-*a* or the memory system controller 115-*a* (e.g., a local memory 120).

In some examples, the memory system 110-*a* may include a physical unclonable function (PUF) 255, which may support the assignment of or generation of an identifier that is unique to the memory system 110-*a* (e.g., for generating a secret identifier or a unique device secret of the memory system 110-*a*). The PUF 255 may include various components or circuit elements that have an intrinsic physical characteristic that is unique to the PUF 255, which may be leveraged to establish an intrinsic uniqueness of the memory system 110-*a*. For example, the PUF may include a set of one or more transistors, resistors, capacitors, memory cells (e.g., SRAM cells, which may, in some cases, be included in local memory 120 described with reference to FIG. 1), or other circuit elements or combination thereof which, when accessed, support the generation of a digital signature that is unique to the memory system 110-*a*. In some examples, a controller of the memory system 110-*a* (e.g., the memory system controller 115-*a*) may access or otherwise interact with the PUF 255 to generate one or more private keys for the memory system 110-*a*, which may subsequently be used to generate public keys for establishing authenticity or encryption between the memory system 110-*a* and the host system 105-*a* (e.g., or the host entities 210, where applicable). Although the PUF 255 is illustrated as being separate from the key storage 250, in some examples, the PUF 255 may be included in or be otherwise interpreted as being part of the key storage 250 (e.g., part of the memory system controller 115-*a*, part of a local memory 120 of the memory system 110-*a*).

In various implementations, the PUF 255 itself, or signaling generated by the PUF 255, or both may be inaccessible from outside the memory system 110-*a*. Such inaccessibility may be supported by various implementations of including the PUF 255, and other components involved in the described cryptographic techniques, in a portion of the memory system 110-*a* where attempts to access such components would be destructive to the components, or where such components or associated signaling are otherwise shielded from destructive or non-destructive probing or snooping techniques. For example, at least the PUF 255 and the other components involved in the described cryptographic techniques (e.g., components involved in handling private keys or unique device secrets, which may include at least a portion of the memory system controller 115-*a* or at least some portion thereof), if not all the components of the memory system 110-*a*, may be implemented in a contiguous semiconductor chip such as an SoC implementation.

In some examples, the memory system 110-*a* may include a public key table 260 (e.g., an elliptical curve cryptography public key table), which may be configured to store, organize, or allocate public keys such as those received from the host system 105-*a*, or those generated at the memory system 110-*a*, or both. In some examples (e.g., in implementations where host entities 210 are associated with respective public keys that are transmitted by the host system 105-*a*), the public key table 260 may hold a respective public key, or mapping thereof, for each of the OEM host entity 210-*a*, the OS vendor host entity 210-*b*, and the ISV host entity 210-*c* (e.g., associated with the partitions 245-*a*, 245-*b*, and 245-*c*, respectively). Although the public key table 260 is illustrated as being separate from the key storage 250, in some examples, the public key table 260 may be included in or be otherwise interpreted as being part of the key storage 250 (e.g., part of the memory system controller 115-*a*, part of a local memory 120 of the memory system 110-*a*).

In some implementations, the public key table 260 may be associated with a mapping between public keys and device identifiers, or partitions 245, or protection attributes (e.g., write protection configurations, read protection configurations), or various combinations thereof, among other mapping between keys and associated configurations. For example, the public key table 260 may provide a mapping for one or more host systems 105 (e.g., the host system 105-*a*), or a host entity 210 thereof, with a particular public key or symmetric key. Such a mapping may also include a mapping between such keys and one or more partitions 245, or a mapping between such keys or partitions 245 with one or more protection attributes, such as whether a partition 245 is configured with read protection, write protection, or both. In some examples, a mapping of the public key table 260 may include a mapping of a key, a host system 105, or a host entity 210 with multiple partitions 245, which may support each partition 245 using a common key but having a unique protection attribute. In some examples, the public key table may support a key hierarchy that allows a master host system 105, or associated key, to assign partitions 245 to another host system 105 or to a host entity 210, or their respective keys.

In some examples, the memory system 110-*a* may include a platform configuration register (PCR) 270, which may store or measure a software state (e.g., version, update status), such as a state of software running on the memory system 110-*a*, and configuration data used by such software (e.g., to represent the platform software state of the memory system 110-*a*). In some examples, the PCR 270 may include information that can be evaluated to determine whether the memory system 110-*a* has been compromised or may be otherwise untrustworthy. Although the PCR 270 is illustrated separately from the memory system controller 115-*a*, in some examples, the PCR 270 may be part of or otherwise associated with the memory system controller 115-*a*, such as a location associated with firmware for the memory system 110-*a* or the memory system controller 115-*a* (e.g., a local memory 120). Such techniques may support the PCR 270 storing or measuring a state of such firmware, which may be used to evaluate whether such firmware has been adversely updated (e.g., to evaluate whether the memory system 110-*a* can be authenticated).

In some examples, the memory system 110-*a* may include a replay-protected memory block (RPMB) 265, which may be provided as a means to store data in an authenticated and replay protected manner, which may only be read and written via successfully authenticated read and write accesses. In some examples, the RPMB 265 may include information that can be evaluated to determine whether signaling exchanged with the memory system 110-*a* has been intercepted and replayed, which may indicate whether one or more devices or connections of the system 200 are untrustworthy. Although the RPMB 265 is illustrated separately from the memory system controller 115-*a*, in some examples, the RPMB 265 may be part of or otherwise associated with the memory system controller 115-*a*, such as a storage location that includes firmware for the memory system 110-*a* or the memory system controller 115-*a* (e.g., a local memory 120). In some examples, the RPMB 265 may be associated with a fixed size, a fixed set of addresses, or both.

In some examples, the memory system 110-*a* may include content 280, which may refer to various types of information stored at the memory system 110-*a*. In some examples, content 280 may be accessed or otherwise used to support various key generation (e.g., content-based key generation) or other cryptographic techniques in accordance with examples as disclosed herein. For example, the content 280 may include firmware of the memory system 110-*a*, such as boot code (e.g., first-stage boot code, "L0" boot code, second-stage boot code, "L1" boot code, boot code that may be called or read by the host system 105-*a*), or an FSD, which may establish an operating or cryptographic state of the memory system 110-*a*. In some examples, information associated with the content 280 may be used by the memory system 110-*a* to support various authentication or encryption techniques (e.g., to generate a certificate for operation with the host system 105-*a*). Although the content 280 is illustrated separately from the memory system controller 115-*a*, in some examples, the content 280 may be part of or otherwise associated with the memory system controller 115-*a*, such as a storage location that includes firmware for the memory system 110-*a* or the memory system controller 115-*a*. Further, although the content 280 is illustrated separately from the storage 240, the content 280 may, in some examples, refer to information that is included in a portion of the storage 240 (e.g., in a separate or dedicated partition 245). In some implementations, the content 280 may receive information from or may refer to one or more aspects of the PCR 270.

One or more components of the system 200 may be configured to implement asymmetric key distribution to establish authenticated signaling, encrypted signaling, or both between the host system 105-*a* and the memory system 110-*a* (e.g., in accordance with authenticated system identity), which may include an implementation of cryptographic security functionality directly in the memory system 110-*a* (e.g., leveraging capabilities of the memory system controller 115-*a* to support various techniques for asymmetric cryptography). In some examples, such techniques may involve passing fundamentally public device identification information between the host system 105-*a* and the memory system 110-*a* that supports private authentication of the respective system (e.g., device-specific or hardware-specific authentication without trying to maintain secrecy or avoid exposure of exchanged private or secret keying material corresponding to respective devices). In some examples, such asymmetric cryptography may be utilized to derive equivalent or otherwise symmetric keys on each side of signaling exchange (e.g., at each of the host system 105-*a* and the memory system 110-*a*) using a common secret that is not itself communicated between the host system 105-*a* and the memory system 110-*a*, which may leverage efficiencies of symmetric key techniques for authenticated or encrypted signaling relative to asymmetric key techniques. In some examples, such techniques may be implemented to establish a virtual authenticated channel 205 between the host system 105-*a* and the memory system 110-*a*, which may be used to transmit signaling (e.g., encrypted signaling, unencrypted signaling) and associated signatures (e.g., asymmetric signatures such as elliptic curve digital signature algorithm (ECDSA) signatures, symmetric signatures such as hashed message authentication code (HMAC) signatures) between the host system 105-*a* and the memory system 110-*a*.

In some examples, the system 200 may be configured to support a signing and verifying (e.g., authentication) of signaling between the host system 105-*a* and the memory system 110-*a* (e.g., in accordance with signed command signaling, signed request signaling, signed data signaling, or signed response signaling), which may be implemented to authenticate the transmitting system of such signaling, or to ensure that the signaling has not been altered before being received by a receiving system, or both. In accordance with such techniques, a receiving system may be able to evaluate received signaling to determine whether transmitted signaling was transmitted by an unverified or unauthorized transmitting system, or whether the transmitted signaling was altered or otherwise compromised. In some examples, such techniques may support a one-to-many security arrangement, since multiple receiving systems may be able to implement a same public key (e.g., of an asymmetric key pair) of the transmitting system that is associated with a single private key (e.g., of the asymmetric key pair) of the transmitting system.

In some examples for signing and verifying signaling between the host system 105-*a* and the memory system 110-*a*, a signature for a given instance of signaling (e.g., a message, a command, a request, a data packet, a response) may be derived by hashing or otherwise processing the instance of signaling with a function (e.g., a hash function, a cryptographic hash algorithm) that receives, as an input, the instance of signaling and a private key associated with the transmitting system. The output of such a function (e.g., a signature, a hash digest) may be recreated using the same function with the same instance of signaling and either the same private key associated with the transmitting system or an associated public key (e.g., of an asymmetric key pair) associated with the transmitting system. In an example, for an instance of signaling associated with a 1-megabyte program operation, a hashing function based on the 1-megabytes of data and a private key may be a 256-bit signature or hash digest.

To support verifying the authenticity of the transmitting system, the transmitting system may transmit the instance of signaling along with the corresponding signature, which may be received by a receiving system. The receiving system may have received or otherwise generated the associated public key of the transmitting system and, accordingly, may generate a trial signature based on the received instance of signaling and the associated public key of the transmitting system. If the trial signature matches the received signature, the receiving system may determine that the transmitting system was authentic (e.g., that the instance of signaling is a transmission from a trusted system) and may continue with processing or otherwise performing a responsive action to the received instance of signaling. In some implementations, signature generation may be configured such that, even when an instance of signaling is the same, a generated signature will be different. In such implementations, signature generation and verification operations may be further based on a random number, a nonce, or a monotonic counter that is understood to both the transmitting system and the receiving system.

In some examples, the system 200 may be configured to support an encryption and decryption of signaling between the host system 105-a and the memory system 110-a (e.g., in accordance with encrypted signatures, encrypted command signaling, encrypted request signaling, encrypted data signaling, or encrypted response), which may be implemented to secure the contents of such signaling from being intercepted and interpreted or otherwise processed (e.g., to maintain integrity of the signaling itself). In accordance with such techniques, a transmitting system may encrypt instances of signaling for transmission using a key (e.g., of a symmetric key pair) known to the transmitting system, and a receiving system may decrypt received instances of such signaling using a key known to the receiving system (e.g., of the same symmetric key pair), which may be the same as the symmetric key known to the transmitting system, or may be otherwise equivalent or operable for such decryption. In some examples, such techniques may support a one-to-one security arrangement, since a symmetric key pair may only be understood to a single transmitting system and a single receiving system (e.g., when a symmetric key pair is based on unique identifiers of each of the transmitting system and the receiving system). However, some cryptographic techniques may support arrangements other than a one-to-one security arrangement, such as when symmetric keys are based on unique identifiers of more than two systems.

Some implementations of the described techniques may utilize asymmetric cryptography where a public key associated with the host system 105-a may be uploaded to one or more memory systems 110 (e.g., the memory system 110-a) without exposing a private key of the host system 105-a, which may prevent an adverse actor from stealing the key and impersonating the real key holder (e.g., impersonating the host system 105-a). Such techniques may also allow a public key to be replaced, which may be different than other techniques such as those related to a RPMB or a replay-protection monotonic counter (RPMC). In some examples, such asymmetric cryptography techniques may facilitate the use of public key infrastructure (PKI) techniques, where keys may be verified through a standardized digital certificate chain.

In some implementations, the exchange of public keys may support the generation of symmetric keys at each of the host system 105-a and the memory system 110-a using such techniques as a Diffie-Hellman key exchange or elliptic-curve techniques, so that a symmetric secret can be shared between device and host without exposing the private keys of the respective systems. In some implementations, an asymmetric Diffie-Hellman key exchange can be performed between the host system 105-a and the memory system 110-a to generate symmetric keys that are then used to enable better performance at the host system 105-a or the memory system 110-a for authentication, encryption, or both. Further, ephemeral symmetric keys can be derived using a same algorithm shared by the host system 105-a and the memory system 110-a to make it more difficult for an adverse actor to extract or replicate such keys, based on various techniques for duration-initiated or event-initiated generation of ephemeral keys.

In some examples, the exchange of public keys may be associated with the creation of digital certificates, which may include various signaling with or other interaction with one or more certificate authorities or registration authorities, or may involve self-signed certificates, or various combinations thereof. For example, the host system 105-a, or a cloud authority or other centralized certification authority in communication with the host system 105-a, may create a certificate signing request (CSR), which may be an example of a self-signed certificate that proves that memory system 110-a has the private key associated with the public key in the CSR. In some examples, such a CSR may be transferred from the memory system 110-a to a centralized certification authority as part of a manufacturing operation (e.g., for manufacturing the memory system 110-a). In some implementations, in response to an identity of the memory system 110-a being confirmed (e.g., by a cloud authority, by a vendor certification), a manufacturer-endorsed certificate may be provided to the host system 105-a, to the memory system 110-a, or to both. In some examples, such techniques may support a requesting system downloading a manufacturer-endorsed certificate (e.g., a certificate endorsed by a certificate authority) or downloading the CSR.

Figure 3:
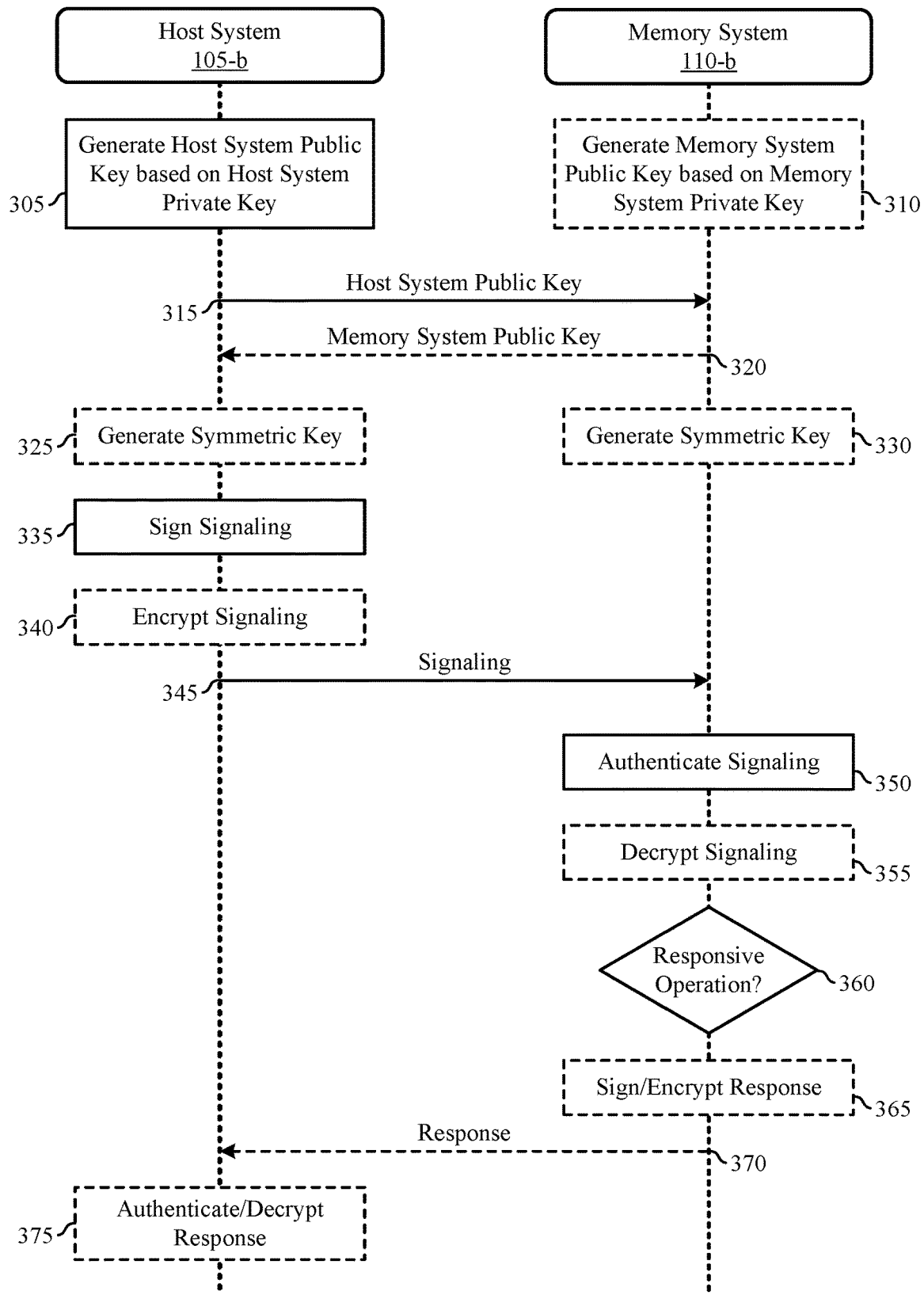
FIG. 3 illustrates an example of a process flow that supports memory system security and authentication using asymmetric keys in accordance with examples as disclosed herein.

FIG. 3 illustrates an example of a process flow 300 that supports memory system security and authentication using asymmetric keys in accordance with examples as disclosed herein. Operations of the process flow 300 may be performed by a host system 105-b and a memory system 110-b, which may be examples of the respective systems described with reference to FIGS. 1 and 2. Aspects of the process flow 300 may be implemented by one or more controllers (e.g., one or more respective controllers at each of the host system 105-b and the memory system 110-b), among other components. Additionally, or alternatively, aspects of the process flow 300 may be implemented as instructions stored in memory (e.g., respective firmware stored in a memory of or coupled with the host system 105-b and the memory system 110-b). For example, the instructions, when executed by a controller, may cause a controller to perform one or more operations of the process flow 300.

In some examples, the process flow 300 may include a generation of public keys that may be communicated between the host system 105-b and the memory system 110-b, which may be referred to as asymmetric keys or asymmetric public keys (e.g., public keys of an asymmetric key pair, public keys that each correspond to a respective private key of an asymmetric key pair). The generation of such public keys may be based on private keys maintained at the respective system, where such private keys are not shared outside the respective system. Such techniques may enable the host system 105-b and the memory system 110-b to sign various transmitted signaling (e.g., for authenticating a transmitting system), or to encrypt various transmitted signaling (e.g., for information integrity), or both without the exchange of private identification information unique to each system. Accordingly, such techniques may improve an ability to communicate with authenticity and integrity compared with other techniques where the distribution of cryptographic hardware identification information is not performed, or where such distribution may be more vulnerable to being cloned or stolen, such as techniques that distribute symmetric keys in a manner that may be insecure.

For example, at 305, the host system 105-b may generate a host system public key, which may be based at least in part on (e.g., calculated using) a host system private key. In various examples, the host system private key may be stored at or otherwise generated at the host system 105-b using a private identifier such as a fuse configuration, an identity stored in non-volatile memory, a PUF of the host system 105-*b*, or some other unique identifier of the host system 105-*b*, which may be protected from being cloned or extracted. In some examples, the host system private key may be generated based on a combination of a unique identifier (e.g., a unique device secret of the host system 105 *b*) and content stored at the host system 105-*a* (e.g., in content 220). In some examples, the host system public key generated at 305 may be associated with a particular host entity 210, or a particular range of addresses at the memory system 110-*b* (e.g., a partition 245, or portion thereof), or a memory protection attribute (e.g., read protection, write protection), or a combination thereof. In some examples, such public key attributes may not be associated with the host system public key generated at 305, but may be later associated with one or more symmetric keys that are generated based at least in part on the host system public key, or may be later assigned by the memory system 110-*a*.

In some examples (e.g., when the host system 105-*b* and the memory system 110-*b* are configured to support symmetric keys, encryption, or both), at 310, the memory system 110-*b* may generate a memory system public key which may be based at least in part on (e.g., calculated using) a memory system private key. In various examples, the memory system private key may be generated at the memory system 110-*b* using a private identifier such as a fuse configuration, an identity stored in non-volatile memory, a PUF 255, or some other unique identifier of the memory system 110-*b*, which may be protected from being cloned or extracted. In some examples, the memory system private key may be generated based on a combination of a unique identifier (e.g., a unique device secret of the memory system 110 *b*) and content stored at the memory system 110 *b* (e.g., in content 280). In some examples, the memory system public key generated at 310 may be associated with a particular range of addresses at the memory system 110-*b* (e.g., a partition 245, or portion thereof), or a memory protection attribute (e.g., read protection, write protection), or a combination thereof. In some examples, a public key associated with the memory system 110-*b* may be paired or otherwise linked with (e.g., mapped with, by a public key table 260) a corresponding host system 105 or host system public key (e.g., a host system public key generated at 305). In some examples, such keying attributes may not be associated with the memory system public key generated at 310, but may be later associated with one or more symmetric keys that are generated based at least in part on the host system public key.

In some examples, the process flow 300 may include an exchange of the generated public keys between the host system 105-*b* and the memory system 110-*b*. For example, at 315, the host system 105-*b* may transmit the host system public key generated at 305, which may be received by the memory system 110-*b*. In some examples, (e.g., when the host system 105-*b* and the memory system 110-*b* are configured to support symmetric keys, encryption, or both), at 320, the memory system 110-*b* may transmit the memory system public key generated at 310, which may be received by the host system 105-*b*. In some examples, the transmitted public keys may be stored at the respective receiving system (e.g., in key storage 215, in key storage 250), such as being stored in a non-volatile storage of or otherwise in communication with the respective receiving system. In some other examples, such transmitted or received public keys may not be stored, but keys generated based on such transmitted or received public keys may be stored upon further processing. In some examples, such asymmetric public keys may be updatable, where such updating (e.g., in accordance with one or more operations of 305 or 310) may be initiated based on a timer or event, and such updated or superseding asymmetric public keys that are subsequently generated may accordingly be transmitted from a generating system to a receiving system.

In some examples, the process flow 300 may include a generation of symmetric keys by the host system 105-*b* and the memory system 110-*b*, which may be calculated based at least in part on the respectively received public keys. Such symmetric keys may be generated to be equal or otherwise equivalent between the two systems (e.g., as a shared secret), or otherwise operable to for one to be used to authenticate information that has been signed using the other, or for one to be used to decode information that has been encoded using the other, or both, despite avoiding the transmission of private information. For example, at 325, the host system 105-*b* may generate a symmetric key, which may be based at least in part on (e.g., calculated using) the memory system public key transmitted at 320 and the private key of the host system 105-*b*. Further, at 330, the memory system 110-*b* also may generate a symmetric key, which may be based at least in part on (e.g., calculated using) the host system public key transmitted at 315 and the private key of the memory system 110-*b*. In some examples, such symmetric keys may be generated using Diffie-Hellmann techniques or other exponential key exchange or generation protocol, including elliptic-curve techniques. In some examples, the generated symmetric keys may be stored at the generating system (e.g., in key storage 215, in key storage 250), such as being stored in a non-volatile storage of or otherwise in communication with the respective generating system.

Although, in some examples, symmetric keys (e.g., "first" symmetric keys) generated from maintained private keys and received public keys may be directly implemented in the techniques disclosed herein, in some other examples, such symmetric keys may applied as inputs to further key generation, such as the generation of ephemeral keys (e.g., "second" symmetric keys, ephemeral symmetric keys). For example, at each of 325 and 330, or some other successive operations, each of the host system 105-*b* and the memory system 110-*b* may generate respective ephemeral keys, which may be relatively temporary in nature. In some examples, the generation of such ephemeral keys may be duration-initiated, such as a generation that is initiated upon a timer value (e.g., at the host system 105-*b*, at the memory system 110-*b*, or both) satisfying a threshold. In some examples, the generation of such ephemeral keys may be event-initiated, such as being initiated upon a power-on of the memory system 110-*b* or the host system 105-*b* (e.g., generating an ephemeral key every power cycle), a reset of the memory system 110-*b* or the host system 105-*b*, an error state of the memory system 110-*b* or the host system 105-*b*. In some examples, either or both of the host system 105-*b* or the memory system 110-*b* may be configured to transmit signaling as a command or a request for the other system to initiate generation or replacement of ephemeral keys, which may be associated with the signaling system having performed an ephemeral key generation or regeneration, or being triggered to or scheduled to perform an ephemeral key generation or regeneration, among other triggers. In some examples, generated ephemeral keys may be stored in volatile storage at or otherwise in communication with the respective generating system (e.g., in key storage 215, in key storage 250), which may be implemented to avoid fatigue or endurance issues associated with periodic updating of ephemeral keys in some non-volatile storage architectures. However, in some implementations (e.g., where fatigue of non-volatile memory cells is not a concern), ephemeral keys may be stored in non-volatile storage.

In some examples, the process flow 300 may include a determination (e.g., by the host system 105-*b*) to transmit signaling to the memory system 110-*b*, which may be associated with a command to access the memory system 110-*b* (e.g., a read command, a write command), or a command or request to reconfigure the memory system 110-*b* (e.g., a request to modify an operational parameter, a request to enter an operational mode, a request to implement a data protection attribute, a polling of a status or configuration of the memory system 110-*b*), among other requests, commands, or other control signaling, which may or may not be accompanied by other data (e.g., write data). Such signaling may be signed, or encrypted, or both in accordance with the described techniques for using asymmetric keys by the host system 105-*b* and the memory system 110-*b*.

In some examples, to support an authentication of such signaling, or an authentication of a transmitter of such signaling (e.g., to authenticate the host system 105-*b*), at 335, the host system 105-*b* may sign the signaling, or at least some portion thereof, based at least in part on (e.g., calculated using) the private key associated with the host system 105-*b*. In some examples, such signing, or a configuration of such signing, may be based on a type or characteristic of the signaling. For example, in some implementations, only certain types of signaling is signed, such as only signing certain access commands (e.g., signing read commands, signing write commands, signing commands to change a protection attribute).

In some examples, the signing of 335 may be based at least in part on a symmetric key generated at 325, which may be more secure than or more efficient than signing based on the private key associated with the host system 105-*b*. A determination to sign the signaling with such a symmetric key may be based on a configuration (e.g., an operating mode, a mode register setting) or an indicated capability of the host system 105-*b*, or a configuration or an indicated capability of the memory system 110-*b*, or both. In some examples, an indication of whether the signaling has been signed using the private key associated with the host system 105-*b* or using the symmetric key generated at 325 may be indicated as part of the transmitted signaling, or may have been indicated by the host system 105-*b* to the memory system 110-*b* in an earlier transmission (e.g., an earlier instance of control signaling), or may have been requested by the memory system 110-*b*. In other words, the host system 105-*b*, or the memory system 110-*b*, or both may be configured to dynamically sign signaling in accordance with either private keys associated with a transmitting device, or generated symmetric keys. In some examples, such a signature may be appended to data included in or otherwise accompanying the signaling, which may or may not be encrypted.

In some examples, to support integrity of such signaling (e.g., information integrity), at 340, the host system 105-*b* may encrypt the signaling, or at least some portion thereof, based at least in part on (e.g., calculated using) a symmetric key generated at 325. In some examples, such encryption, or a configuration of such encryption, may be based on a type or characteristic of the signaling, or associated information. For example, in some implementations, only certain types of signaling is encrypted, such as only encrypting certain access commands (e.g., encrypting read commands, encrypting write commands, encrypting data associated with write commands, encrypting commands to change a protection attribute).

At 345, the host system 105-*b* may transmit the signaling, of which at least a portion may have been signed, or encrypted, or both signed and encrypted, and which may be received by the memory system 110-*b*. In some examples, the signaling of 340 may include or be accompanied by a flag or other indication that the signaling has been signed, or encrypted, or both signed and encrypted, such as a vendor-specific bit accompanying or otherwise associated with the signaling. Accordingly, the memory system 110-*b* may process such an indication to evaluate whether the received signaling of 345 can or should be authenticated, decrypted, or both authenticated and decrypted (e.g., to determine whether to perform the operations of 350, the operations of 355, or both the operations of 350 and 355)

For example, at 350, the memory system 110-*b* may attempt to authenticate the signaling of 345 (e.g., to validate or authenticate the host system 105-*b*, or a host entity 210 associated with the host system 105-*b*, as being the transmitter of the signaling). In various examples, an authentication evaluation at 350 may be based on based on a configuration or operating mode associated with authentication using asymmetric keys, or using symmetric keys, or both, which may be based on an indication of the signaling of 345, or prior signaling from the host system 105-*b*. For example, to support an authentication of the signaling, or the transmitter thereof, the memory system 110-*b* may verify the signaling, or at least some portion thereof, based at least in part on (e.g., using) the host system public key received at 315, or based at least in part on a symmetric key generated at 330.

In some examples, at 355, the memory system 110-*b* may attempt to decrypt the signaling of 345. In various examples, the decryption at 355 may be based on based on a configuration or operating mode of the host system 105-*b*, of the memory system 110-*b*, or both, or may be based on an indication of the signaling itself. For example, to support a decryption of the signaling, the memory system 110-*b* may decrypt the signaling, or at least some portion thereof, based at least in part on (e.g., using) the symmetric key generated at 330. In some examples, the decryption of 355 may only be performed if the signaling was authenticated at 350.

At 360, the memory system 110-*b* may evaluate whether to perform an operation in response to the signaling of 345. For example, if an authentication of 350 supports a determination that the signaling of 345 was transmitted by a trusted system (e.g., by the host system 105-*b*), the memory system 110-*b* may determine to perform a responsive action, such as performing an access of the memory system 110-*b* commanded by the signaling of 345, or updating an operational parameter of the memory system 110-*b* commanded or requested by the signaling of 345. In some examples, such operations may include performing an access command in accordance with information (e.g., write information) that was decrypted at 355. Alternatively, if an authentication of 350 does not support a determination that the signaling of 345 was transmitted by a trusted system (e.g., by the host system 105-*b*), the memory system 110-*b* may determine to not perform a responsive operation in accordance with the signaling of 345, where such a determination may or may not be signaled back to the host system 105-*b*.

In some examples, the host system 105-*b*, the memory system 110-*b*, or both may be configured to exchange response signaling based on (e.g., responsive to) communicated signaling (e.g., responsive to the signaling of 345). For example, in response to signaling associated with an access command from the host system 105-*b*, the memory system 110-*b* may transmit an acknowledgment that the command was received, an indication of whether or not the commanded access was performed, an identification of whether or not the commanded access was successful, or an identification of whether or not the access command, or the transmitting system thereof, was authenticated, among other responsive signaling. In some examples, such a response may include information from the original command to confirm action, such as returning or reflecting data of a write operation (e.g., unencrypted, encrypted, or hashed) to confirm write accuracy. In some examples (e.g., in response to a read command), such a response may include information from the memory system 110-*b* (e.g., from storage 240), such as requested read data (e.g., unencrypted or encrypted). In various implementations, such a response may be signed, or encrypted, or both signed and encrypted, which may include similar techniques as the operations of 335 and 340, or different operations (e.g., based on a configuration or operating mode, based on a type of signaling associated with such a response).

In some examples, to support an authentication of such a response, or an authentication of a transmitter of such a response (e.g., to authenticate the memory system 110-*b*), at 365, the memory system 110-*b* may sign the response, or at least some portion thereof, based at least in part on (e.g., calculated using) the private key associated with the memory system 110-*b*. In some examples, such signing, or a configuration of such signing, may be based on a type or characteristic of the response. For example, in some implementations, only certain types of response signaling is signed, such as only signing responses to certain access commands (e.g., signing responses to read commands, signing responses to write commands, signing responses to commands to change a protection attribute). In some examples, the signing of 365 may be based at least in part on a symmetric key generated at 330, which may be more secure than or more efficient than signing based on the private key associated with the memory system 110-*b*.

In some examples, to support integrity of such a response (e.g., response integrity, information integrity), at 365, the memory system 110-*b* may encrypt the response, or at least some portion thereof, based at least in part on (e.g., calculated using) a symmetric key generated at 330. In some examples, such encryption, or a configuration of such encryption, may be based on a type or characteristic of the response, or associated information. For example, in some implementations, only certain types of response signaling is encrypted, such as only encrypting responses to certain access commands (e.g., encrypting responses to write commands, encrypting responses to read commands, encrypting data associated with read commands, encrypting responses to commands to change a protection attribute).

At 360, the memory system 110-*b* may transmit the response, of which at least a portion may have been signed, or encrypted, or both signed and encrypted, and which may be received by the host system 105-*b*. In some examples, the signaling of 370 may include or be accompanied by a flag or other indication that the signaling has been signed, or encrypted, or both signed and encrypted, such as a vendor-specific bit accompanying or otherwise associated with the response signaling. Accordingly, the host system 105-*b* may process such an indication to evaluate whether the received response of 370 can or should be authenticated, decrypted, or both authenticated and decrypted (e.g., to determine whether the response can be trusted)

For example, at 375, the host system 105-*b* may attempt to authenticate the response signaling of 370 (e.g., to validate or authenticate the memory system 110-*b* as being the transmitter of the response). In various examples, an authentication evaluation at 375 may be based on based on a configuration or operating mode associated with authentication using asymmetric keys, or using symmetric keys, or both, which may be based on an indication of the signaling 345, or of the response signaling of 370, or of prior signaling from the host system 105-*b* or from the memory system 110-*b*. For example, to support an authentication of the response signaling, or the transmitter thereof, the host system 105-*b* may verify the signaling, or at least some portion thereof, based at least in part on (e.g., using) the memory system public key received at 320, or based at least in part on a symmetric key generated at 325.

In some examples, at 375, the host system 105-*b* may attempt to decrypt the signaling of 370. In various examples, a decryption at 375 may be based on based on a configuration or operating mode of the host system 105-*b*, of the memory system 110-*b*, or both, or may be based on an indication of the signaling of 345 or the response signaling of 370. For example, to support a decryption of the response signaling, the host system 105-*b* may decrypt the signaling, or at least some portion thereof, based at least in part on (e.g., using) the symmetric key generated at 325. In some examples, a decryption of 375 may only be performed if an authentication of 375 was successful.

Figure 4:
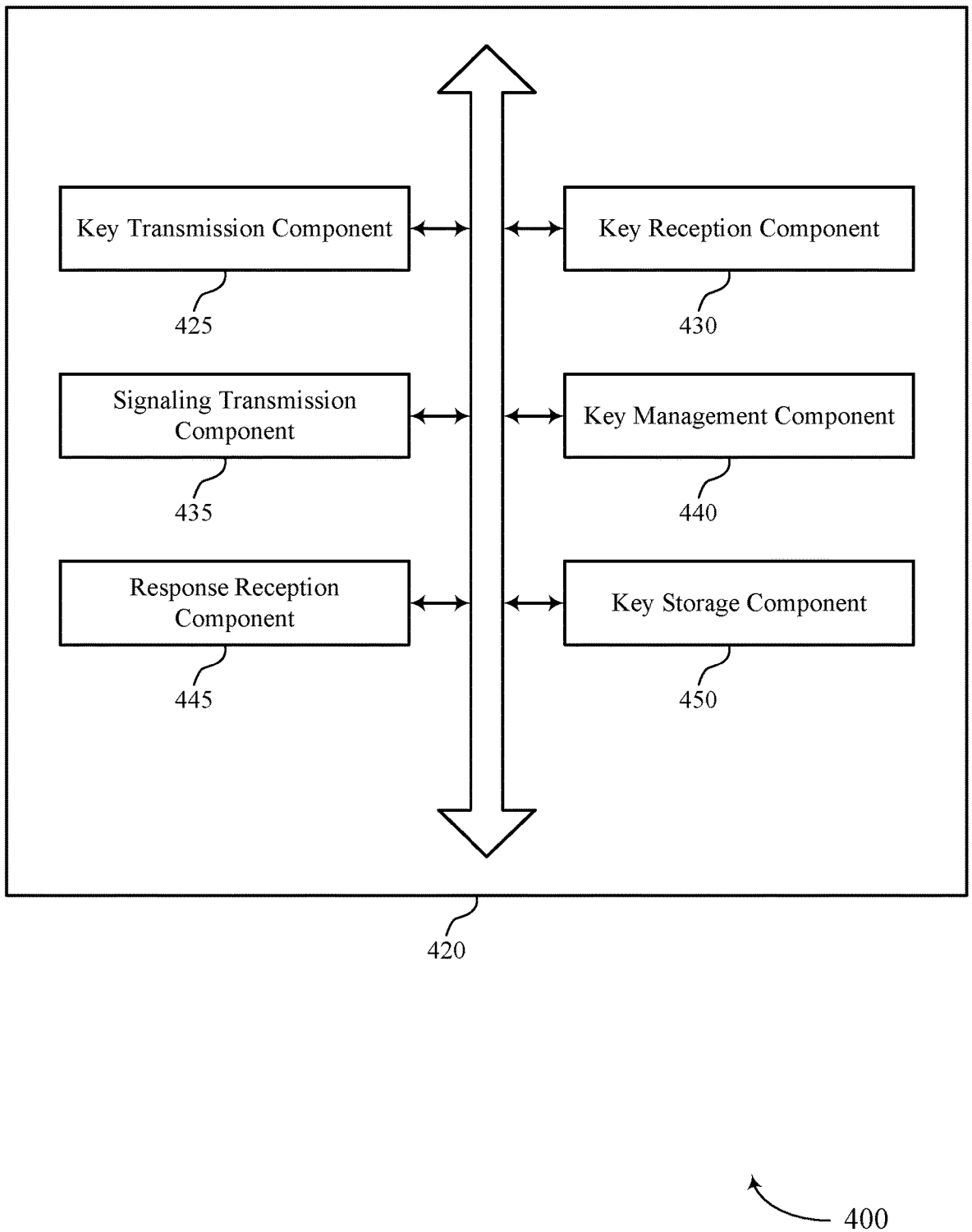
FIG. 4 shows a block diagram of a host system that supports memory system security and authentication using asymmetric keys in accordance with examples as disclosed herein.

FIG. 4 shows a block diagram 400 of a host system 420 that supports memory system security and authentication using asymmetric keys in accordance with examples as disclosed herein. The host system 420 may be an example of aspects of a host system as described with reference to FIGS. 1 through 3. The host system 420, or various components thereof, may be an example of means for performing various aspects of memory system security and authentication using asymmetric keys as described herein. For example, the host system 420 may include a key transmission component 425, a key reception component 430, a signaling transmission component 435, a key management component 440, a response reception component 445, a key storage component 450, or any combination thereof. Each of these components may communicate, directly or indirectly, with one another (e.g., via one or more buses).

The key transmission component 425 may be configured as or otherwise support a means for transmitting a public key (e.g., an asymmetric key) associated with the host system 420, where the public key is based at least in part on a private key associated with the host system 420. The signaling transmission component 435 may be configured as or otherwise support a means for transmitting signaling (e.g., to the memory system), where at least a portion of the signaling is signed based at least in part on the private key associated with the host system 420. In some examples, the signaling may include a command to access the memory system or a command to modify an operational parameter of the memory system.

In some examples, the key reception component 430 may be configured as or otherwise support a means for receiving a public key associated with a memory system, where the public key associated with the memory system is based at least in part on a private key associated with the memory system and is different than the public key associated with the host system 420. In some examples, the signaling transmission component may be configured to encrypt at least a portion of the signaling based at least in part on the private key associated with the host system 420, the public key associated with the memory system, or both.

In some examples, the key management component 440 may be configured as or otherwise support a means for generating a symmetric key based at least in part on the private key associated with the host system 420 and the received public key associated with the memory system, and the at least a portion of the signaling may be encrypted based at least in part on the symmetric key. In some examples, the key storage component 450 may be configured as or otherwise support a means for storing the symmetric key in a non-volatile storage location (e.g., at the host system 420 or otherwise in communication with the host system 420).

In some examples, the key management component 440 may be configured as or otherwise support a means for generating a second symmetric key (e.g., an ephemeral key) that is based at least in part on the symmetric key, and the at least a portion of the signaling may be encrypted based at least in part on the second symmetric key. In some examples, the key storage component 450 may be configured as or otherwise support a means for storing the second symmetric key in a volatile storage location (e.g., at the host system 420 or otherwise in communication with the host system 420). In some examples, generating the second symmetric key may be based at least in part on a power-on of the memory system or a reset of the memory system. In some examples, generating the second symmetric key may be based at least in part on an elapsed time since a prior key generation satisfying a threshold. In some examples, the key management component 440 may be configured as or otherwise support a means for receiving signaling to initiate a key generation (e.g., from the memory system), and generating the second symmetric key is performed in response to the signaling to initiate the key generation.

In some examples, the private key associated with the host system may be associated with host entity of the host system 420, and the key management component 440 may be configured as or otherwise support a means for generating the public key associated with the host system 420 based at least in part on a private key associated with the host entity of the host system 420. In some examples, the public key associated with the host system may be associated with a range of addresses of the memory system. In some examples, the range of addresses may be associated with a memory protection attribute.

In some examples, the key management component 440 may be configured as or otherwise support a means for generating the public key associated with the host system 420 based at least in part on a master host private key and a private key associated with an entity of the host system 420.

In some examples, the key reception component 430 may be configured as or otherwise support a means for receiving a public key associated with the memory system, wherein the public key associated with the memory system is based at least in part on a private key associated with the memory system and is different than the public key associated with the host system 420. In some examples, the response reception component 445 may be configured as or otherwise support a means for receiving a response to the signaling. In some examples, the response reception component 445 may be configured as or otherwise support a means for attempting to authenticate at least a portion of the response based at least in part on the public key associated with the memory system.

Figure 5:
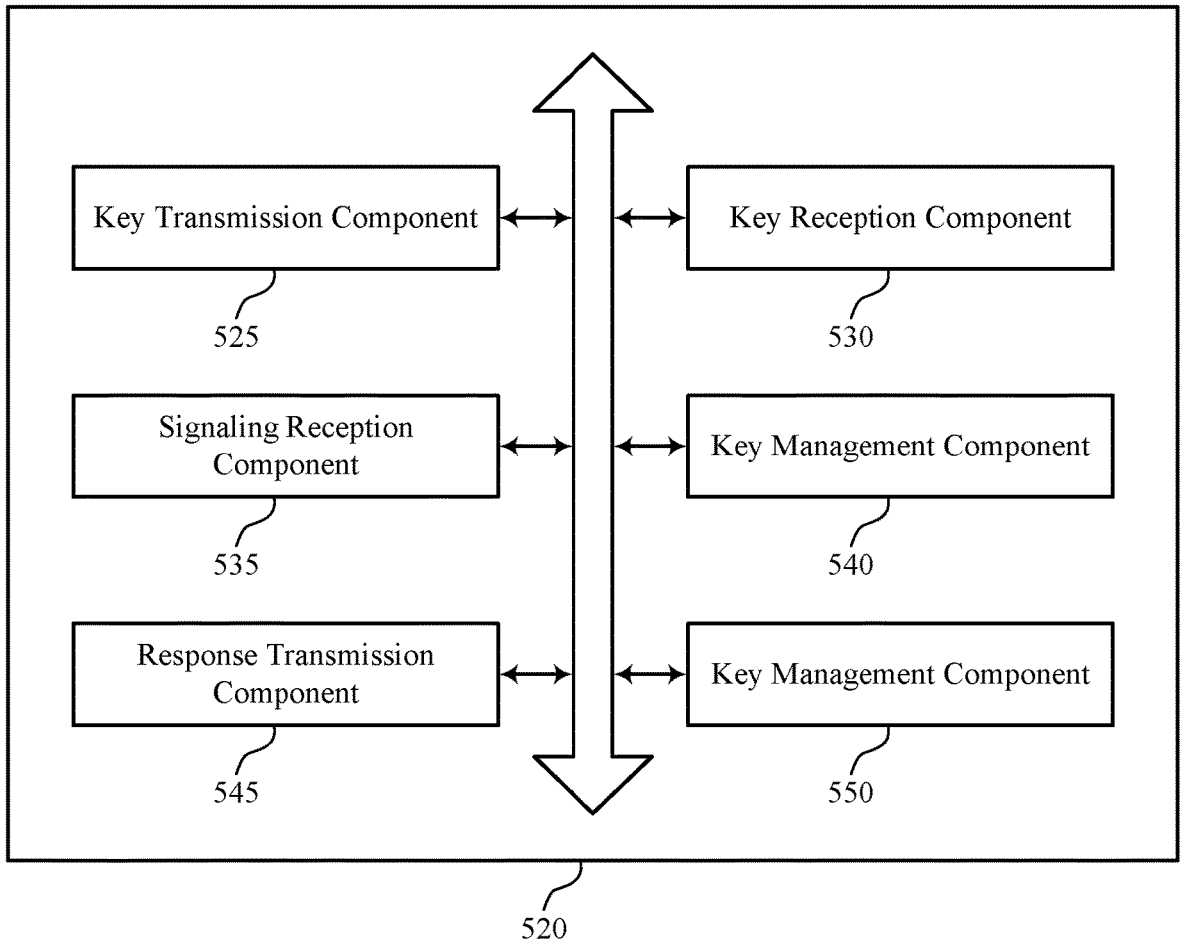
FIG. 5 shows a block diagram of a memory system that supports memory system security and authentication using asymmetric keys in accordance with examples as disclosed herein.

FIG. 5 shows a block diagram 500 of a memory system 520 that supports memory system security and authentication using asymmetric keys in accordance with examples as disclosed herein. The memory system 520 may be an example of aspects of a memory system as described with reference to FIGS. 1 through 3. The memory system 520, or various components thereof, may be an example of means for performing various aspects of memory system security and authentication using asymmetric keys as described herein. For example, the memory system 520 may include a key transmission component 525, a key reception component 530, a signaling reception component 535, a key management component 540, a response transmission component 545, a key storage component 550, or any combination thereof. Each of these components may communicate, directly or indirectly, with one another (e.g., via one or more buses).

The key reception component 530 may be configured as or otherwise support a means for receiving a public key associated with a host system, where the public key associated with the host system is based at least in part on a private key associated with the host system. The signaling reception component 535 may be configured as or otherwise support a means for receiving signaling from the host system. In some examples, the signaling reception component 535 may be configured as or otherwise support a means for determining a response to the signaling (e.g., what responsive action to take or whether to take a responsive action, such as whether to access the memory system 520) based at least in part on attempting to authenticate at least a portion of the signaling, where the attempting to authenticate the at least a portion of the signaling is based at least in part on the public key associated with the host system. In some examples, the signaling may include a command to access the memory system 520 or a command to modify an operational parameter of the memory system 520.

The key transmission component 525 may be configured as or otherwise support a means for transmitting a public key (e.g., an asymmetric key) associated with the memory system 520, where the public key associated with the memory system 520 is based at least in part on a private key associated with the memory system 520 and is different than the public key associated with the host system. In some examples, the signaling reception component 535 may be configured as or otherwise support a means for attempting to decrypt at least a portion of the signaling based at least in part on the private key associated with the memory system 520, the public key associated with the host system, or both In some examples, the key management component 540 may be configured as or otherwise support a means for generating a symmetric key based at least in part on the private key associated with the memory system 520 and the public key associated with the host system, and attempting to decrypt the at least a portion of the signaling may be based at least in part on the symmetric key. In some examples, the key storage component 550 may be configured as or otherwise support a means for storing the symmetric key in a non-volatile storage location (e.g., at the memory system 520 or otherwise in communication with the memory system 520).

In some examples, the key management component 540 may be configured as or otherwise support a means for generating a second symmetric key (e.g., an ephemeral key) that is based at least in part on the symmetric key, and attempting to decrypt the at least a portion of the signaling may be based at least in part on the second symmetric key. In some examples, the key storage component 550 may be configured as or otherwise support a means for storing the second symmetric key in a volatile storage location (e.g., at the memory system 520 or otherwise in communication with the memory system 520). In some examples, generating the second symmetric key may be based at least in part on a power-on of the memory system 520 or a reset of the memory system 520. In some examples, generating the second symmetric key may be based at least in part on an elapsed time since a prior key generation satisfying a threshold. In some examples, the key management component 540 may be configured as or otherwise support a means for receiving signaling to initiate a key generation (e.g., from the host system), and generating the second symmetric key may be performed in response the signaling to initiate the key generation.

In some examples, the public key associated with the memory system may be associated with a range of addresses of the memory system 520. In some examples, the range of addresses may be associated with a memory protection attribute.

In some examples, the key transmission component 525 may be configured as or otherwise support a means for transmitting (e.g., to the host system) a public key associated with the memory system 520, where the public key associated with the memory system 520 is based at least in part on a private key associated with the memory system 520 and is different than the public key associated with the host system. In some examples, the response transmission component 545 may be configured as or otherwise support a means for transmitting (e.g., to the host system) a response to the signaling, and at least a portion of the response may signed based at least in part on the private key associated with the memory system 520.

In some examples, the key management component 540 may be configured as or otherwise support a means for generating the private key associated with the memory system 520 based at least in part on a physically unclonable function at the memory system 520.

Figure 6:
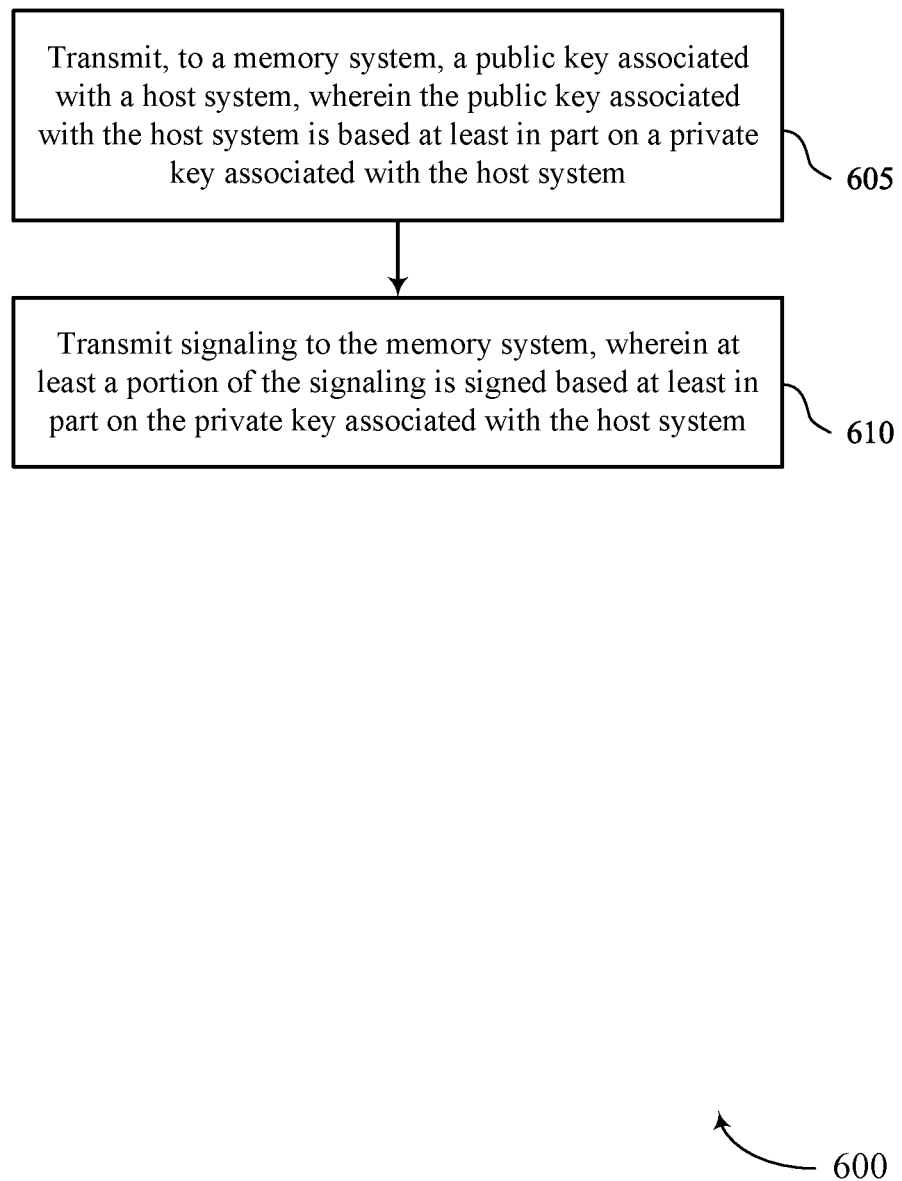
FIGS. 6 and 7 show flowcharts illustrating methods that support memory system security and authentication using asymmetric keys in accordance with examples as disclosed herein.

FIG. 6 shows a flowchart illustrating a method 600 that supports memory system security and authentication using asymmetric keys in accordance with examples as disclosed herein. The operations of method 600 may be implemented by a host system or its components as described herein. For example, the operations of method 600 may be performed by a host system as described with reference to FIGS. 1 through 4. Aspects of the method 600 may be implemented by a controller, among other components. Additionally, or alternatively, aspects of the method 600 may be implemented as instructions stored in memory (e.g., firmware stored in a memory of or coupled with a host system). For example, the instructions, when executed by a controller, may cause the controller to perform the operations of the method 600. In some examples, a host system may execute a set of instructions to control the functional elements of the device to perform the described functions. Additionally, or alternatively, the host system may perform aspects of the described functions using special-purpose hardware.

At 605, the method may include transmitting to a memory system, a public key associated with a host system, where the public key associated with the host system is based at least in part on a private key associated with the host system. The operations of 605 may be performed in accordance with examples as disclosed herein. In some examples, aspects of the operations of 605 may be performed by a key transmission component 425 as described with reference to FIG. 4.

At 610, the method may include transmitting signaling to the memory system, where at least a portion of the signaling is signed based at least in part on the private key associated with the host system. The operations of 610 may be performed in accordance with examples as disclosed herein. In some examples, aspects of the operations of 610 may be performed by a signaling transmission component 435 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor), or any combination thereof for performing the following aspects of the present disclosure:

Aspect 1: A method or apparatus, including operations, features, circuitry, logic, means, or instructions, or any combination thereof for transmitting, to a memory system, a public key associated with a host system, wherein the public key associated with the host system is based at least in part on a private key associated with the host system; and transmitting signaling to the memory system, wherein at least a portion of the signaling is signed by the host system based at least in part on the private key associated with the host system.

Aspect 2: The method or apparatus of aspect 1, wherein the signaling includes a command to access the memory system or a command to modify an operational parameter of the memory system.

Aspect 3: The method or apparatus of any of aspects 1 through 2, further including operations, features, circuitry, logic, means, or instructions, or any combination thereof for receiving a public key associated with the memory system, wherein the public key associated with the memory system is based at least in part on a private key associated with the memory system and is different than the public key associated with the host system; and encrypting at least a portion of the signaling based at least in part on the private key associated with the host system, the public key associated with the memory system, or both.

Aspect 4: The method or apparatus of aspect 3, further including operations, features, circuitry, logic, means, or instructions, or any combination thereof for generating a symmetric key based at least in part on the private key associated with the host system and the public key associated with the memory system, wherein the at least a portion of the signaling is encrypted based at least in part on the symmetric key.

Aspect 5: The method or apparatus of aspect 4, further including operations, features, circuitry, logic, means, or instructions, or any combination thereof for storing the generated symmetric key in a non-volatile storage location.

Aspect 6: The method or apparatus of any of aspects 4 through 5, further including operations, features, circuitry, logic, means, or instructions, or any combination thereof for generating a second symmetric key that is based at least in part on the symmetric key, wherein the at least a portion of the signaling is encrypted based at least in part on the second symmetric key.

Aspect 7: The method or apparatus of aspect 6, further including operations, features, circuitry, logic, means, or instructions, or any combination thereof for storing the generated second symmetric key in a volatile storage location.

Aspect 8: The method or apparatus of any of aspects 6 through 7, further including operations, features, circuitry, logic, means, or instructions, or any combination thereof for generating the second symmetric key based at least in part on a power-on of the memory system or a reset of the memory system.

Aspect 9: The method or apparatus of any of aspects 6 through 8, further including operations, features, circuitry, logic, means, or instructions, or any combination thereof for generating the second symmetric key based at least in part on an elapsed time since a prior key generation satisfying a threshold.

Aspect 10: The method or apparatus of any of aspects 6 through 9, further including operations, features, circuitry, logic, means, or instructions, or any combination thereof for receiving signaling to initiate a key generation (e.g., from the memory system) and generating the second symmetric key in response to the signaling to initiate the key generation.

Aspect 11: The method or apparatus of any of aspects 4 through 10, where the private key is associated with a host entity of the apparatus, the method or apparatus further including operations, features, circuitry, logic, means, or instructions, or any combination thereof for generating the public key associated with the host system based at least in part on the private key associated with the host entity of the host system.

Aspect 12: The method or apparatus of any of aspects 4 through 11 where the public key associated with the host system or the symmetric key is associated with a range of addresses of the memory system.

Aspect 13: The method or apparatus of aspect 12, where the range of addresses is associated with a memory protection attribute.

Aspect 14: The method or apparatus of any of aspects 1 through 13, further including operations, features, circuitry, logic, means, or instructions, or any combination thereof for generating the public key associated with the host system based at least in part on a master host private key and a private key associated with an entity of the host system.

Aspect 15: The method or apparatus of any of aspects 1 through 14, further including operations, features, circuitry, logic, means, or instructions, or any combination thereof for receiving a public key associated with the memory system, wherein the public key associated with the memory system is based at least in part on a private key associated with the memory system and is different than the public key associated with the host system; receiving a response to the signaling; and attempting to authenticate at least a portion of the response based at least in part on the public key associated with the memory system.

Figure 7:
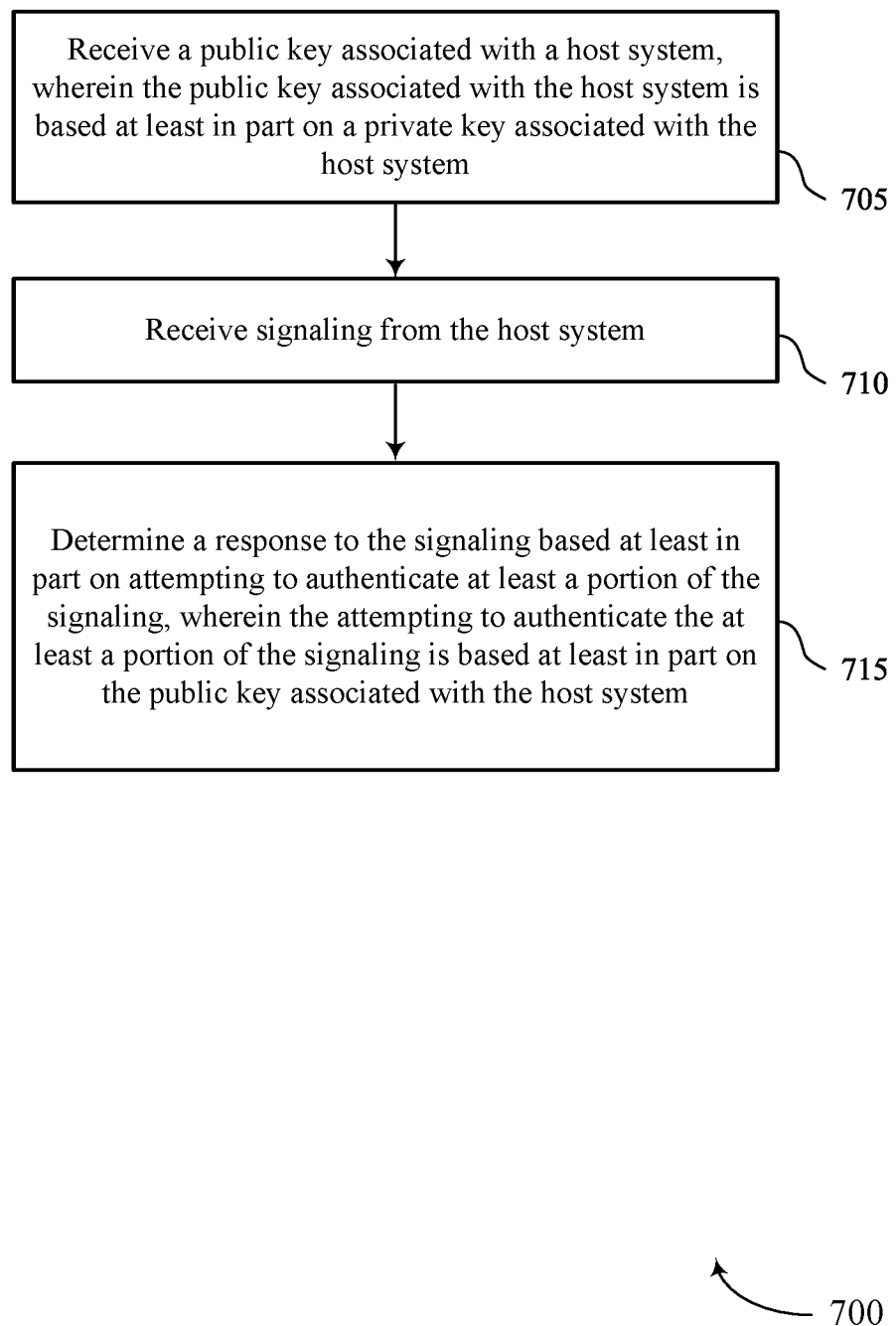

FIG. 7 shows a flowchart illustrating a method 700 that supports memory system security and authentication using asymmetric keys in accordance with examples as disclosed herein. The operations of method 700 may be implemented by a memory system or its components as described herein. For example, the operations of method 700 may be performed by a memory system as described with reference to FIGS. 1 through 3 and 5. Aspects of the method 700 may be implemented by a controller, among other components. Additionally, or alternatively, aspects of the method 700 may be implemented as instructions stored in memory (e.g., firmware stored in a memory of or coupled with a memory system). For example, the instructions, when executed by a controller, may cause the controller to perform the operations of the method 700. In some examples, a memory system may execute a set of instructions to control the functional elements of the device to perform the described functions. Additionally, or alternatively, the memory system may perform aspects of the described functions using special-purpose hardware.

At 705, the method may include receiving (e.g., at the memory system) a public key associated with a host system, where the public key associated with the host system is based at least in part on a private key associated with the host system. The operations of 705 may be performed in accordance with examples as disclosed herein. In some examples, aspects of the operations of 705 may be performed by a key reception component 530 as described with reference to FIG. 5.

At 710, the method may include receiving (e.g., at the memory system) signaling from the host system. The operations of 710 may be performed in accordance with examples as disclosed herein. In some examples, aspects of the operations of 710 may be performed by a signaling reception component 535 as described with reference to FIG. 5.

At 715, the method may include determining a response to the signaling based at least in part on attempting to authenticate at least a portion of the signaling, where the attempting to authenticate the at least a portion of the signaling is based at least in part on the public key associated with the host system. The operations of 715 may be performed in accordance with examples as disclosed herein. In some examples, aspects of the operations of 715 may be performed by a signaling reception component 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 16: A method or apparatus, including operations, features, circuitry, logic, means, or instructions, or any combination thereof for receiving, at a memory system, a public key associated with a host system, where the received public key associated with the host system is based at least in part on a private key associated with the host system; receiving, at the memory system, signaling from the host system; and determining, at the memory system, a response to the signaling based at least in part on attempting to authenticate at least a portion of the signaling, where the attempting to authenticate the at least a portion of the signaling is based at least in part on the public key associated with the host system.

Aspect 17: The method or apparatus of aspect 16, where the signaling includes a command to access the memory system or a command to modify an operational parameter of the memory system.

Aspect 18: The method or apparatus of any of aspects 16 through 17, further including operations, features, circuitry, logic, means, or instructions, or any combination thereof for transmitting a public key associated with the memory system, wherein the public key associated with the memory system is based at least in part on a private key associated with the memory system and is different than the public key associated with the host system; and attempting to decrypt at least a portion of the signaling based at least in part on the private key associated with the memory system, the public key associated with the host system, or both.

Aspect 19: The method or apparatus of aspect 18, further including operations, features, circuitry, logic, means, or instructions, or any combination thereof for generating a symmetric key based at least in part on the private key associated with the memory system and the public key associated with the host system, wherein the attempting to decrypt the at least a portion of the signaling is based at least in part on the symmetric key.

Aspect 20: The method or apparatus of aspect 19, further including operations, features, circuitry, logic, means, or instructions, or any combination thereof for generating a second symmetric key that is based at least in part on the symmetric key, wherein attempting to decrypt the at least a portion of the signaling is based at least in part on the second symmetric key Aspect 21: The method or apparatus of aspect 20, further including operations, features, circuitry, logic, means, or instructions, or any combination thereof for generating the second symmetric key based at least in part on a power-on of the memory system or a reset of the memory system.

Aspect 22: The method or apparatus of any of aspects 20 through 21, further including operations, features, circuitry, logic, means, or instructions, or any combination thereof for generating the second symmetric key based at least in part on an elapsed time since a prior key generation satisfying a threshold.

Aspect 23: The method or apparatus of any of aspects 20 through 22, further including operations, features, circuitry, logic, means, or instructions, or any combination thereof for receiving signaling to initiate a key generation from the host system, and generating the second symmetric key in response the signaling to initiate the key generation.

Aspect 24: The method or apparatus of any of aspects 19 through 23, where the public key associated with the memory system or the symmetric key is associated with a range of addresses of the memory system.

Aspect 25: The method or apparatus of aspect 24, where the range of addresses is associated with a memory protection attribute.

Aspect 26: The method or apparatus of any of aspects 16 through 15, further including operations, features, circuitry, logic, means, or instructions, or any combination thereof for transmitting (e.g., to the host system) a public key associated with the memory system, wherein the public key associated with the memory system is based at least in part on a private key associated with the memory system and is different than the public key associated with the host system; and transmit a response to the signaling, where at least a portion of the response is signed based at least in part on the private key associated with the memory system.

Aspect 27: The method or apparatus of any of aspects 16 through 26, further including operations, features, circuitry, logic, means, or instructions, or any combination thereof for generating the private key associated with the memory system based at least in part on a physically unclonable function at the memory system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A host system, comprising:
processing circuitry configured to couple with a memory system, wherein the processing circuitry is configured to cause the host system to:
transmit, to the memory system, a public key associated with the host system, wherein the public key associated with the host system is based at least in part on a private key associated with the host system, the private key generated based at least in part on an identifier of a host entity of a plurality of host entities of the host system;
transmit one or more commands to modify a protection attribute of the memory system corresponding to a partition of a plurality of partitions of the memory system, the one or more commands encrypted and signed by the host system based at least in part on the private key associated with the host system, wherein each of the plurality of host entities is associated with a corresponding partition of the plurality of partitions, and each of the plurality of partitions corresponds to a respective range of addresses of the memory system and is associated with a respective protection attribute; and
receive at least one response to the one or more commands based at least in part on the encryption and signing of the one or more commands, the at least one response associated with performance of one or more operations to modify the protection attribute responsive to at least one of the one or more commands.

2. The host system of claim 1, wherein the processing circuitry is configured to cause the host system to:
receive a public key associated with the memory system, wherein the public key associated with the memory system is based at least in part on a private key associated with the memory system and is different than the public key associated with the host system;
generate a symmetric key based at least in part on the private key associated with the host system and the public key associated with the memory system; and
encrypt and sign a portion of the one or more commands based at least in part on the symmetric key.

3. The host system of claim 2, wherein the processing circuitry is configured to cause the host system to:
store the symmetric key in a non-volatile storage location.

4. The host system of claim 2, wherein the processing circuitry is configured to cause the host system to:
generate a second symmetric key based at least in part on an elapsed time since a prior key generation satisfying a threshold and based at least in part on the symmetric key, the second symmetric key being different than the symmetric key and associated with an expiration duration, wherein the portion of the one or more commands is encrypted based at least in part on the second symmetric key.

5. The host system of claim 4, wherein the processing circuitry is configured to cause the host system to:
store the second symmetric key in a volatile storage location.

6. The host system of claim 4, wherein the processing circuitry is configured to cause the host system to:
generate the second symmetric key based at least in part on a power-on of the memory system or a reset of the memory system.

7. The host system of claim 4, wherein the processing circuitry is configured to cause the host system to:
receive signaling to initiate a key generation from the memory system; and
generate the second symmetric key in response to the signaling to initiate the key generation.

8. The host system of claim 2, wherein the processing circuitry is configured to cause the host system to:
generate the public key associated with the host system based at least in part on the private key of the host system.

9. The host system of claim 2, wherein the public key associated with the host system or the symmetric key is associated with a first range of addresses of the memory system that corresponds to the partition, and wherein a second public key associated with the host system or a second symmetric key is associated with a second range of addresses of the memory system that correspond to a second partition of the plurality of partitions based at least in part on a second identifier of a second host entity of the plurality of host entities.

10. The host system of claim 1, wherein the processing circuitry is configured to cause the host system to:
generate the public key associated with the host system based at least in part on a master host private key of the host system and a private key associated with the host entity of the host system.

11. The host system of claim 1, wherein the processing circuitry is configured to cause the host system to:
receive a public key associated with the memory system, wherein the public key associated with the memory system is based at least in part on a private key associated with the memory system and is different than the public key associated with the host system; and
attempt to authenticate at least a portion of the at least one response based at least in part on the public key associated with the memory system.

12. The host system of claim 1, wherein performance of the one or more operations to modify the protection attribute comprises enabling or disabling a write protection attribute of the partition, enabling or disabling a read protection attribute of the partition, or a combination thereof.

13. A memory system, comprising:
one or more memory devices; and
one or more controllers coupled with the one or more memory devices and configured to cause the memory system to:
receive a public key associated with a host system, wherein the public key associated with the host system is based at least in part on a private key associated with the host system, the private key based at least in part on an identifier of a host entity of a plurality of host entities of the host system;

receive one or more commands from the host system to modify a protection attribute of the memory system corresponding to a partition of a plurality of partitions of the memory system, the one or more commands encrypted and signed based at least in part on the private key associated with the host system, wherein each of the plurality of host entities is associated with a corresponding partition of the plurality of partitions, and each of the plurality of partitions corresponds to a respective range of addresses of the memory system and is associated with a respective protection attribute; and determine a response to the one or more commands based at least in part on attempting to authenticate the one or more commands, the response associated with performance of one or more operations to modify the protection attribute, wherein the attempting to authenticate the one or more commands is based at least in part on the public key associated with the host system.

14. The memory system of claim 13, wherein the one or more controllers is configured to cause the memory system to:

transmit a public key associated with the memory system, wherein the public key associated with the memory system is based at least in part on a private key associated with the memory system and is different than the public key associated with the host system;

generate a symmetric key based at least in part on the private key associated with the memory system and the public key associated with the host system; and attempt to decrypt a portion of the one or more commands based at least in part on the symmetric key.

15. The memory system of claim 14, wherein the one or more controllers is configured to cause the memory system to:

generate a second symmetric key based at least in part on an elapsed time since a prior key generation satisfying a threshold and based at least in part on the symmetric key, the second symmetric key being different than the symmetric key and associated with an expiration duration, wherein attempting to decrypt the portion of the one or more commands is based at least in part on the second symmetric key.

16. The memory system of claim 15, wherein the one or more controllers is configured to cause the memory system to:

generate the second symmetric key based at least in part on a power-on of the memory system or a reset of the memory system.

17. The memory system of claim 15, wherein the one or more controllers is configured to cause the memory system to:

receive signaling to initiate a key generation from the host system; and generate the second symmetric key in response to the received signaling to initiate the key generation.

18. The memory system of claim 14, wherein the public key associated with the memory system or the symmetric key is associated with a first range of addresses of the one or more memory devices that corresponds to the partition, and wherein a second public key associated with the memory system or a second symmetric key is associated with a second range of addresses of the one or more memory devices that correspond to a second partition of the plurality of partitions based at least in part on a second identifier of a second host entity of the plurality of host entities.

19. The memory system of claim 13, wherein the one or more controllers is configured to cause the memory system to:

transmit a public key associated with the memory system, wherein the public key associated with the memory system is based at least in part on a private key associated with the memory system and is different than the public key associated with the host system; and transmit a response to the one or more commands, wherein at least a portion of the response is signed by the memory system based at least in part on the private key associated with the memory system.

20. The memory system of claim 13, wherein the one or more controllers is configured to cause the memory system to:

generate the private key associated with the memory system based at least in part on a physically unclonable function at the memory system.

21. The memory system of claim 13, wherein performance of the one or more operations to modify the protection attribute comprises enabling or disabling a write protection attribute of the partition, enabling or disabling a read protection attribute of the partition, or a combination thereof.

22. A non-transitory computer-readable medium storing code comprising instructions which, when executed by one or more processors of an electronic device, cause the electronic device to:

transmit, by a host system, a public key associated with the host system, wherein the public key is based at least in part on a private key associated with the host system, the private key generated based at least in part on an identifier of a host entity of a plurality of host entities of the host system;

transmit, by the host system, one or more commands to modify a protection attribute of a memory system corresponding to a partition of a plurality of partitions of the memory system, wherein at least a portion of the one or more commands is encrypted and signed by the host system based at least in part on the private key associated with the host system, wherein each of the plurality of host entities is associated with a corresponding partition of the plurality of partitions, and each of the plurality of partitions corresponds to a respective range of addresses of the memory system and is associated with a respective protection attribute; and receive at least one response to the one or more commands based at least in part on the encryption and signing of the one or more commands, wherein the at least one response is associated with performance of one or more operations to modify the protection attribute responsive to at least one command of the one or more commands.

23. The non-transitory computer-readable medium of claim 22, wherein performance of the one or more operations to modify the protection attribute comprises enabling or disabling a write protection attribute of the partition, enabling or disabling a read protection attribute of the partition, or a combination thereof.

24. A non-transitory computer-readable medium storing code comprising instructions which, when executed by one or more processors of an electronic device, cause the electronic device to:

receive, at a memory system, a public key associated with a host system, wherein the public key associated with the host system is based at least in part on a private key associated with the host system, the private key based at least in part on an identifier of a host entity of a plurality of host entities of the host system;

receive, at the memory system, one or more commands from the host system to modify a protection attribute of the memory system corresponding to a partition of a plurality of partitions of the memory system, the one or more commands encrypted and signed based at least in part on the private key associated with the host system, wherein each of the plurality of host entities is associated with a corresponding partition of the plurality of partitions, and each of the plurality of partitions corresponds to a respective range of addresses of the memory system and is associated with a respective protection attribute; and determine a response to the one or more commands based at least in part on attempting to authenticate at least a portion of the one or more commands, the response associated with performance of one or more operations to modify the protection attribute of the memory system, wherein the attempting to authenticate the one or more commands is based at least in part on the public key associated with the host system.

25. The non-transitory computer-readable medium of claim 24, wherein performance of the one or more operations to modify the protection attribute comprises enabling or disabling a write protection attribute of the partition, enabling or disabling a read protection attribute of the partition, or a combination thereof.

\* \* \* \* \*